Aug. 2, 1932.  A. H. RANGNOW  1,869,437
ANTIVIBRATION DEVICE
Filed July 28, 1931
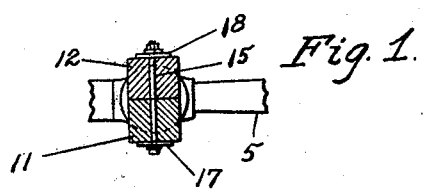
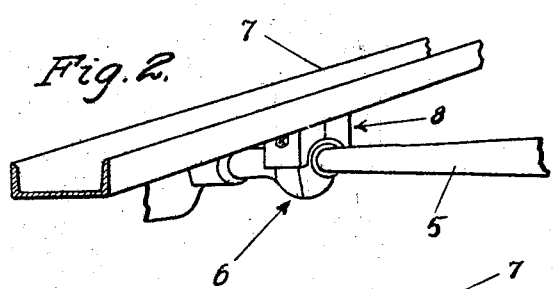
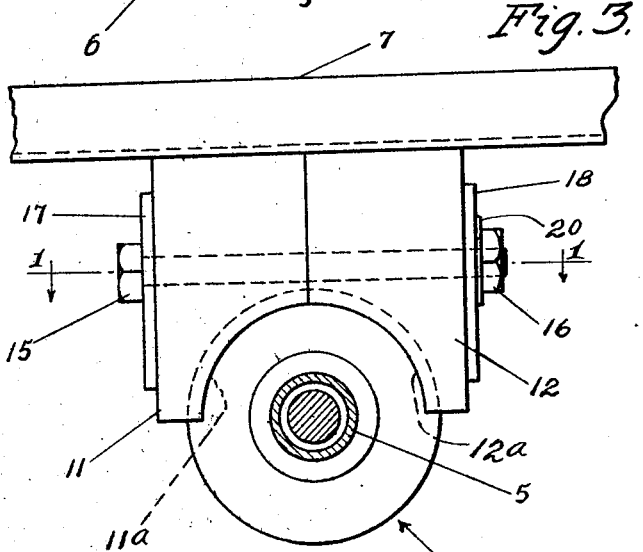
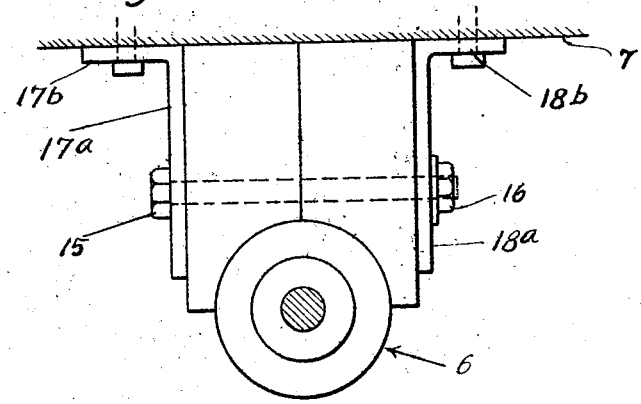
INVENTOR.
Albert H. Rangnow
BY Robt. H. Pearson
ATTORNEYS.

Patented Aug. 2, 1932

1,869,437

UNITED STATES PATENT OFFICE

ALBERT H. RANGNOW, OF LOS ANGELES, CALIFORNIA

ANTIVIBRATION DEVICE

Application filed July 28, 1931. Serial No. 553,575.

This invention relates to a device to reduce the vibration of the universal joint which forms a part of the main drive ordinarily provided for self-propelled vehicles.

It is an object of the invention to provide a vibration preventor of the character stated which can at small expense be conveniently attached to the chassis of a self-propelled vehicle in a position to prevent vibration of the universal joint of the drive, practically no alteration or change in the construction of vehicles now on the market being necessary in order to attach the device to them.

A further object of the invention is to provide an antivibration device of the character stated which will, among its other merits, possess the advantage of adapting itself to slight inequalities in the size and shape of the parts with which it is designed to cooperate, thereby making it unnecessary to shape differently each device before it is applied to an individual vehicle, but making it possible to provide a few standard shapes and sizes of the device which will be sufficient to fit all makes of vehicles which are now on the market.

Other objects, advantages and features of the invention may hereinafter appear.

Referring to the accompanying drawing which illustrates what is at present deemed to be a preferred embodiment of the invention, Fig. 1 is a transverse section, on a reduced scale, on line 1—1 of Fig. 3.

Fig. 2 is a perspective view which includes a fragment of a cross bar of the chassis together with a fragment of the power drive, the invention being shown in its operative position between the universal joint and the cross bar.

Fig. 3 is a cross section through the drive looking toward the universal joint.

Fig. 4 is a view similar to Fig. 3 but showing a modified form of the invention.

Referring in detail to the drawing, the drive 5, universal joint 6, and cross piece 7 of the chassis are of well known construction, the invention residing in the vibration arrestor 8 which is interposed between said universal joint and cross piece. Said vibration arrestor includes the two rubber bodies 11 and 12, preferably of identical construction, said rubber bodies being in Fig. 3 shown as clamped together by means of the bolt 15 which is provided with a nut 16, said bolt having under its head a washer plate 17 and under its nut a like washer plate 18, a locking washer 20 being desirably inserted between the washer plate 18 and the nut 16.

The rubber body 11 is provided with a segmental recess 11a and the rubber body 12 is likewise provided with a segmental recess 12a, said rubber bodies being clamped together in such a manner that these segmental recesses cooperate to form a semi-circular seat to receive the upper portion of the more or less spherical or spheroidal universal joint member 6.

In Fig. 4 is shown a modification wherein side flanges or hanger plates 17a and 18a are substituted respectively for the washer plates 17 and 18 of Fig. 3. In this modification the hanger plate 17a is provided with an attaching flanges 17b and the hanger plate 18a is provided with an attaching flange 18b, the hanger plates thus being bolted to the lower side of the cross piece of the chassis.

I claim:

1. The combination, with the frame and drive of a self-propelled vehicle, said drive being provided with a universal joint and said frame having a cross piece; of a body of elastic material which consists of two complementary parts which are recessed to form a seat for the casing of said universal joint, and means to secure the complementary parts of said bodies together between said universal joint and cross piece and in position to prevent vibration of said universal joint.

2. The combination, with the drive of a self-propelled vehicle, said drive being provided with a universal joint; of two bodies of resilient material, each of said bodies having a recess complementary to that of the other whereby when said bodies are assembled in their operative positions a seat is provided for the casing of said universal joint, and means to secure said two bodies in their operative positions between the chassis of the vehicle and the casing of said universal joint.

3. In a device of the kind described, the combination, with a vehicle and its chassis; of two complementary shock absorbing bodies which are recessed in such a manner that when they are secured together in their operative positions a spheroidal recess is provided, said bodies when thus secured together presenting a flat face at the side opposite to said spheroidal recess, and means to secure said bodies together with said flat face abutting against a portion of the chassis of said vehicle and with said spheroidal recess seated upon the casing of the universal joint of the drive.

In testimony whereof, I hereunto affix my signature.

ALBERT H. RANGNOW.